UNITED STATES PATENT OFFICE.

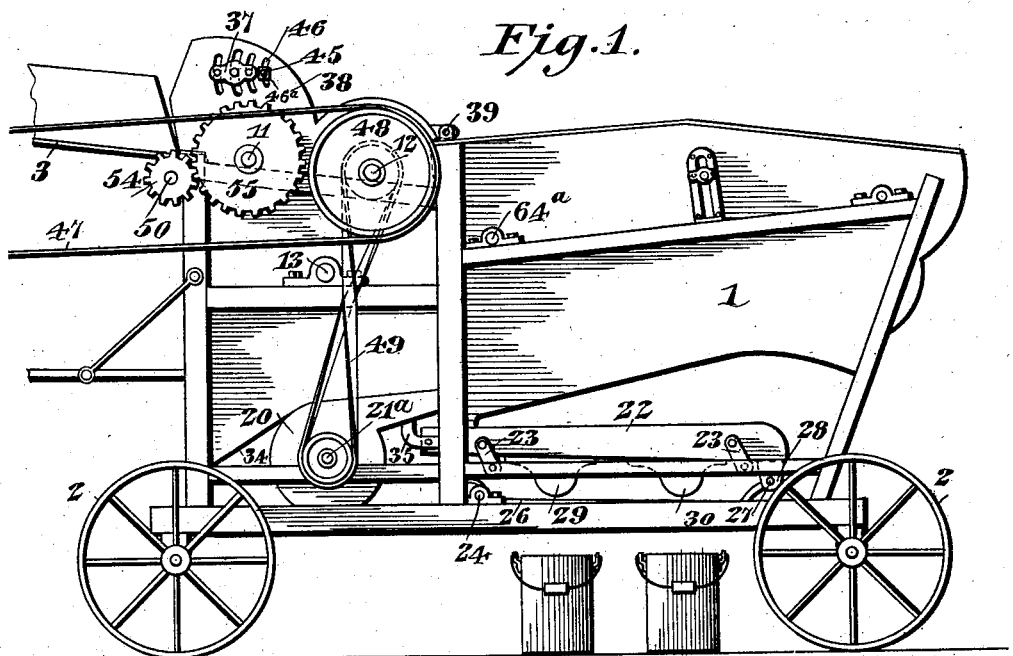
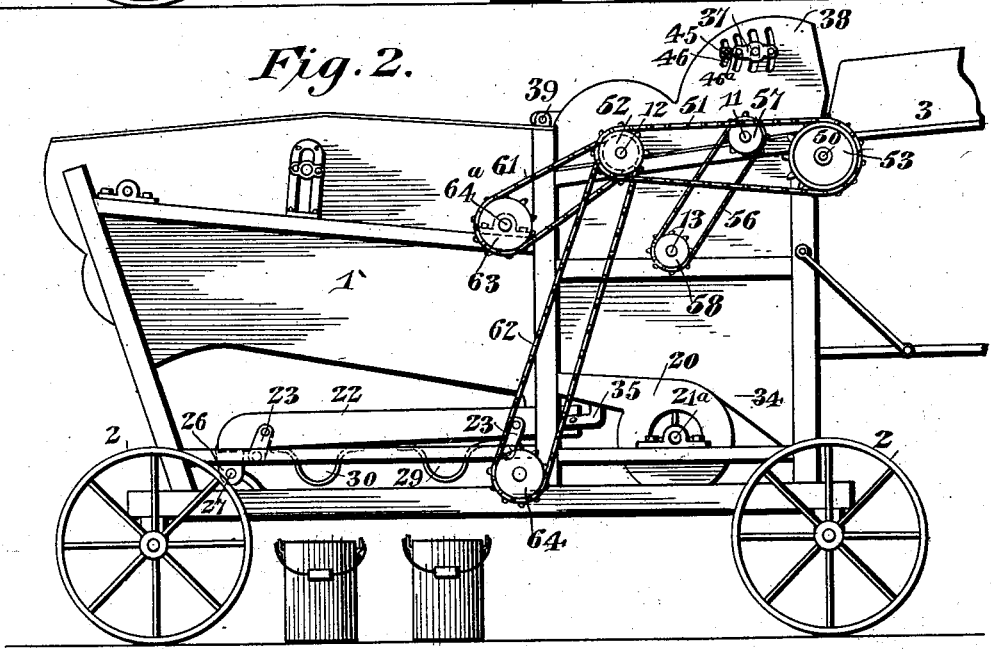

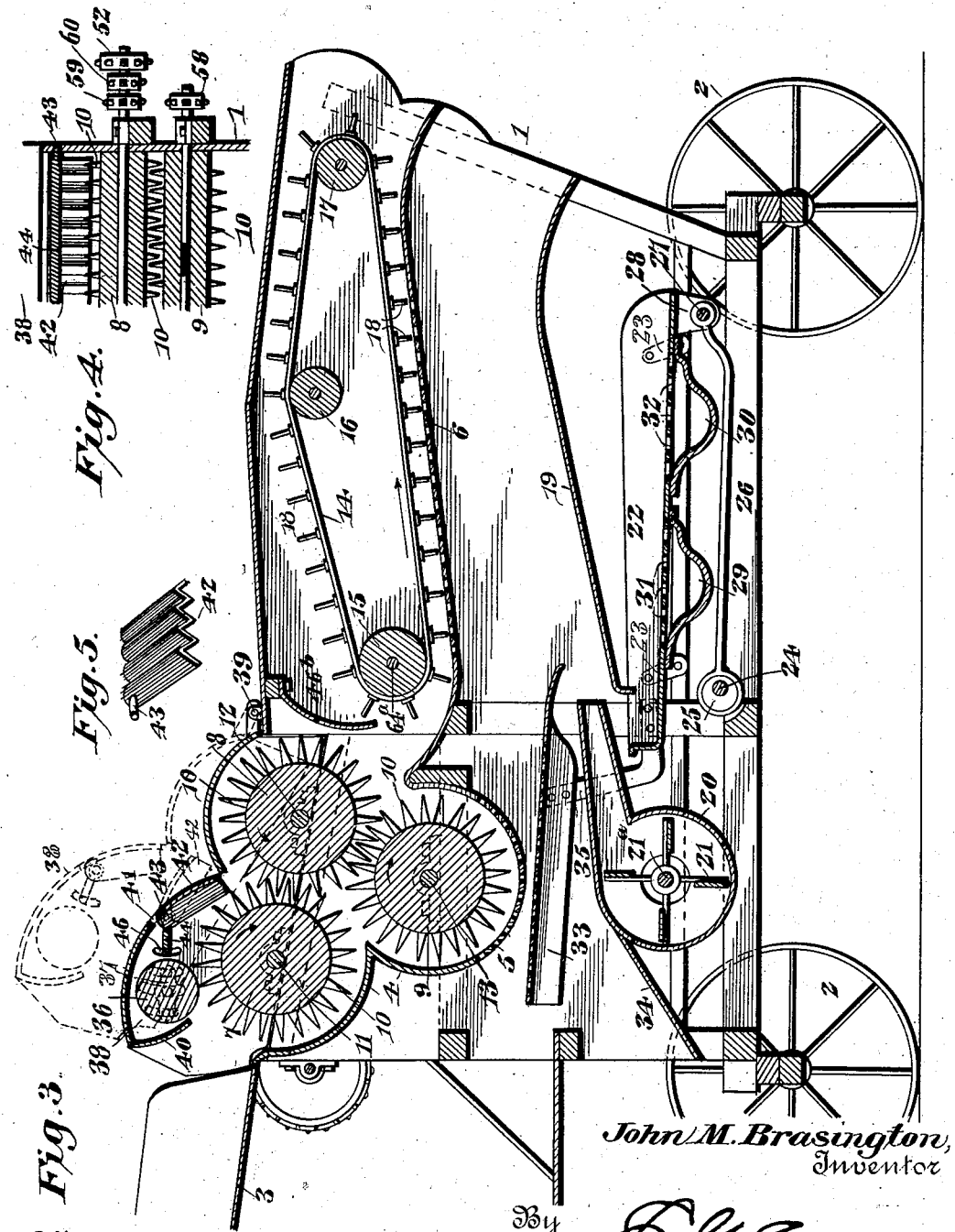

JOHN MARION BRASINGTON, OF BENNETTSVILLE, SOUTH CAROLINA.

PEA-THRESHING MACHINE.

SPECIFICATION forming part of Letters Patent No. 724,793, dated April 7, 1903.

Application filed October 3, 1901. Serial No. 77,470. (No model.)

*To all whom it may concern:*

Be it known that I, JOHN MARION BRASINGTON, a citizen of the United States, residing at Bennettsville, in the county of Marlboro and State of South Carolina, have invented a new and useful Pea-Threshing Machine, of which the following is a specification.

My present invention relates to machines for threshing peas and the like, and is especially designed as an improvement upon the thresher illustrated and described in Letters Patent No. 569,978, issued to me January 11, 1898.

The object of the invention is to improve the mechanism for effecting the separation of the peas from the hulls or pods, vines, and dirt and to provide a novel arrangement of instrumentalities for thoroughly cleaning the separated peas and for grading them prior to their delivery to separate receptacles provided for the reception of peas of different grades.

A further object of the invention is to so construct the threshing mechanism proper that the choking of the concave or of the threshing-cylinders by the heavy fiber of the pea-vines will be impossible; and further and subordinate objects of the invention will hereinafter be made apparent as the necessity for their accomplishment is developed in the succeeding description of that preferred form of my invention which I have illustrated in the accompanying drawings.

In said drawings, Figure 1 is a side elevation of one side of my pea-threshing machine complete. Fig. 2 is a similar view of the opposite side thereof. Fig. 3 is a central longitudinal section through the machine, and Fig. 4 is a detail sectional view illustrating the manner in which the teeth of the cylinders intermesh and the relative position of the vine-crusher.

Like numerals of reference are employed to designate corresponding parts throughout the views.

The machine comprises a suitable framework or casing 1, supported by wheels 2 and having at one end a suitable feed-board 3, from which the pea-vines are fed by hand or otherwise to the threshing mechanism inclosed within the casing or frame 1. Adjacent to the front end of the thresher is located a double concave 4, the bottom wall of which is made foraminous, as indicated at 5, and is extended to form an upwardly and rearwardly inclined horizontal screen 6, extending from the concave to the rear extremity of the thresher and having its ends oppositely curved, as shown. The threshing mechanism comprehended by my present improvement comprises a plurality of threshing-cylinders, preferably three in number, (designated by the numerals 7, 8, and 9,) and provided with radially-disposed spikes or teeth 10. These threshing-cylinders are carried by shafts 11, 12, and 13, journaled in suitable bearings at opposite sides of the frame, and are so disposed that the cylinders 7 and 9 are located out of mesh with each other, but concentric with the two cavities of the concave and in mesh, respectively, with the cylinder 8—that is to say, the cylinder 8, which is the primary or most active threshing-cylinder, is disposed with its teeth in interfitting relation with the teeth of the cylinders 7 and 9 and maintains a position directly in rear of the cylinder 7, but in a slightly-lower horizontal plane. Thus as the pea-vines are fed into the thresher from the feed-board 3 they will be caught by the teeth of the cylinder 7 and carried back to the cylinder 8, which rotates at a higher rate of speed than either of the cylinders 7 and 9, which rotate practically in unison.

As the vines are fed between the cylinders 7 and 8 a large percentage of the peas will be separated and permitted to gravitate to the bottom of the concave 4, together with a large percentage of the smaller particles of hulls and dirt. The vines, however, will retain a small percentage of peas and will be carried between the cylinders 8 and 9, where they will be rethreshed and thrown upon the front upwardly-curved end of the screen 6.

For the purpose of conveying the vines rearwardly over the screen or sieve in order to effect the separation of the remaining peas from the vines I prefer to employ an endless conveyer 14, passed around suitable rollers 15, 16, and 17 and provided with teeth 18, which engage the vines and drag them over the screen 6, from the rear end of which the threshed and separated vines are discharged beyond the machine.

We have now seen in what manner the vines are threshed and conveyed through the machine and how the peas and small particles of debris are permitted to gravitate through the foraminous concave 4 and through the screen 6; but it is evident that means must now be provided for cleaning the separated peas from these small particles and for grading the peas preparatory to their delivery to separate receptacles. Below the screen 6 is located an incline 19, above which a blast is directed rearwardly from a blower 20, within the casing of which a rotary fan 21 is operated. The peas and debris dropping through the screen 6 are subjected to the action of the blast, which separates and carries off the dirt and other light particles, and the peas gravitate down the incline 19, from the front end of which they are deposited within the upper forward end of the rearwardly-inclined grading or riddle shoe 22, supported by upstanding links 23 and vibrated longitudinally through the medium of an eccentric-shaft 24, carrying an eccentric 25, connected to the strap of an eccentric-rod 26, pivotally connected, as indicated at 27, to a lug 28, depending from the rear lower end of the shoe.

Beneath the shoe 22 and preferably carried thereby are two or more pea-chutes 29 and 30, into which peas of different grades are deposited from within the shoe through suitable openings 31 and 32 of different sizes. The openings 31 in the bottom wall of the shoe are smaller than the openings over the succeeding chute or chutes, so that as the peas deposited from the incline 19 gravitate toward the lower end of the grading-shoe from the upper end thereof the smallest peas will be deposited into the first chute, and the successively larger peas will in like manner be deposited in the succeeding chute or chutes.

For the purpose of depositing the peas gravitating from the concave upon the incline 19 for delivery to the shoe I provide immediately under the foraminous portion of the concave 4 a rearwardly-inclined shaking-screen 33, the mesh of which is too small to permit the escape of the peas, but is sufficiently large to permit the greater portion of the dirt and debris to drop upon the inclined top of the blower-casing, from which it passes down an incline 34 and is delivered from the thresher at the front end thereof. The peas from which the greater portion of the debris is thus separated gravitate rearwardly upon the shaking-screen 33 and at a point in rear of the screen are discharged upon the incline 19, the blast from the blower serving by reason of this arrangement to separate the lighter particles from the body of peas delivered from the shaking-screen 33, as well as from the peas which gravitate through the screen 6 to the incline, in the manner stated. Any suitable means for vibrating the shaking-screen 33 may be provided; but I prefer to support said screen rigidly upon upstanding angular arms 35, secured to the front end of the grading-shoe, so that the vibratory motion communicated to said shoe will be transmitted to the shaking-screen.

The feed of the vines to the threshing mechanism is regulated by a horizontal feed-roller 36, journaled in vertically-adjustable bearings 37 in the opposite side walls of the concave-cover 38, hinged to the top wall of the frame in rear of the cylinder 8, as indicated at 39, and provided in front of the feed-roller 36 with a transverse guard 40. The feed-roller 36 is designed to force the pea-vines into engagement with the teeth of the first cylinder 7, and as it is desirable to crush and cut the vines more or less prior to the threshing thereof I provide the top wall of the cover 38 with a transverse opening 41, in which is seated a swinging vine crusher and cutter 42, consisting of a transversely-disposed strip of crimped metal pivoted at its upper end, as indicated at 43. To prevent the vines from passing around the feed-roller 36, a swinging guard-plate 44 is horizontally disposed between the roller and the vine-crusher 42 and is provided with studs 45, engaging arcuate guide-slots 46 in the side wall of the cover 38. This guard-plate is retained in its adjusted position by binding-nuts 46$^a$, screwed upon the outer ends of the studs 45 and bearing against the side walls of the cover 38.

In rear of the cylinder 8 is located, as indicated in Fig. 3, a stripper and guard-plate 46$^b$, designed to insure the delivery of the pea-vines to the screen 6 from between the cylinders 8 and 9, it being obvious that any tendency of the vines to be carried up and around the cylinder 8 will be prevented by the engagement of the vines with the lower end of the stripper, which will insure their detachment from the teeth of the cylinder and their passage to a point where they will be caught and carried forward by the conveyer 14.

Many expedients for properly gearing the operating parts of the thresher to a suitable source of power may be devised; but I prefer to gear the various shafts of the machine together in the manner illustrated in Figs. 1 and 2 of the drawings. The main power-belt 47, extending from the drive-pulley of an engine, is passed around a suitable belt pulley or wheel 48, keyed upon the shaft 12 of the cylinder 8 at one side of the thresher, and said shaft is in turn geared by a belt 49 to the shaft 21$^a$ of the fan 21. (See Fig. 1.) At the opposite side of the thresher the shaft 12 is geared to a shaft 50 by means of a sprocket-chain 51, passing around sprocket-pulleys 52 and 53 on said shafts. The shaft 50 is located at the front end of the thresher immediately below the rear end of the feed-board 3 and at its end opposite the sprocket-wheel 53 is provided with a pinion 54, engaging a gear-wheel 55 upon the adjacent end of the shaft 11 of the cylinder 7, it being observed that the shafts 11 and 12 are thus connected by speed-reducing gearing, as it is desired that the cylinder 8 rotate at a much higher rate of speed than either of the cylinders 7 and 9. These last-named cylinders are designed to rotate at about the same speed and are therefore geared together at the left-hand side of the thresher by means of the sprocket-chain 56, passing around sprocket-wheels 57 and 58, keyed to the adjacent ends of the shafts 11 and 13. The gearing of the parts is then completed by providing the shaft 12, adjacent to the sprocket-wheel 52, with sprocket-wheels 59 and 60, geared by sprocket-chains 61 and 62, with suitable sprocket-wheels 63 and 64, mounted upon the left-hand ends of the conveyer-shaft 64$^a$ and the eccentric-shaft 24.

Briefly the operation of the machine is as follows: Pea-vines are fed from the feed-board 3, under the guard 40, and between the feed-roller 38 and the threshing-cylinder 7. The cover 36, hinged at its rear end, is of metal, and its weight is therefore considerable. Vines passing through the machine will consequently be forced against the first threshing-cylinder 7 and will lift the roller 36, and with it the cover 38. The vines will therefore be subjected to the combined weight of the roller and cover and will be mashed down immediately prior to the presentation of said vines to the swinging crusher and cutter 42, located at that point at which the mass of vines is deflected, or broken downwardly to pass between the threshing-cylinders 7 and 8. The swinging crusher and cutter 42, being a heavy strip of crimped metal, hinged at its upper edge in the cover, will bear upon the vines adjacent to the point at which the two upper cylinders coöperate, will sever the vines into short lengths and will yield both on its pivot 43 and bodily according to the fluctuating quantity of vines being fed through the machine. That is to say, the plate 42 will vibrate from its hinge in order to have what is, in effect, a chopping action upon the vines, and will also yield bodily when the mass of vines passing through the machine is sufficient to raise the heavy cover 38, in which the crimped plate 42 is mounted. Thus as a considerable quantity of vines is fed to the threshing mechanism from the feed-board 3 the cover will be raised and will vibrate in accordance with the varying bulk of the material, and in addition to this vibratory movement of the cover the cutting and crushing plate 42 will have an individual vibratory movement, tending to mash or crush the vines into still closer contact with the cylinder 7 and to cut the heavy tendrils of the vines into short lengths just prior to the passage of the vines between the threshing-cylinders.

An important feature of the invention will now be noted. It is evident that as the vines are passed into the machine horizontally over the cylinder 7 the viney mass must break downwardly in order to pass between the cylinders 7 and 8 and must again break forwardly in order to be passed back over the screen 6, extending horizontally from the threshing mechanism. In other words, the mass of vines while being acted upon by the threshing mechanism is given a compound break as it passes over the first cylinder from the feed-board and under the adjacent cylinder to the screen. By reason of the fact that the upper and lower cylinders 7 and 9 are rotated in the same direction and at the same speed and coöperate with the third cylinder, rotating in an opposite direction and at a higher speed, all of the teeth engaging the vines will move in the direction of movement of said vines through the machine and at the same time a threshing action will be secured, because the teeth of the third cylinder 8 will move faster than the adjacent teeth of the other cylinders. It will therefore be seen that the mass of vines is given a compound break, is fed forward by threshing-cylinders all moving with the vines, and is thoroughly threshed by reason of the rotation of the several cylinders at different speeds.

As the vines are threshed between the cylinders 7 and 8 a large proportion of the peas (possibly seventy-five per cent.) and a considerable quantity of small particles of dirt and other debris will drop to the bottom of the concave 4, from whence they will escape to the shaking-screen 33. This screen will separate the dirt from the peas and will deliver the latter to the incline 19, within the range of a blast from the blower. The dirt separated from the peas by the shaking-screen will drop down the incline 34 and pass from the machine. As the vines pass between the cylinders 8 and 9 they will be rethreshed and will thence pass to the screen 6 and will be fed thereover toward the rear end of the machine. The peas and light particles of debris still retained by the vines will during the progress of the mass over the screen drop through the latter into the blast from the blower, so that said blast after having passed through the peas dropping from the shaking-screen 33 will remove the debris from the peas dropping from the screen 6. The peas dropping from the screen will be deposited upon the incline 19 and, gravitating down the latter in the face of the blast, will be deposited in the upper front end of the grading or riddle shoe 22 with the peas received from the shaking-screen. The vibratory inclined shoe will now grade the peas in a manner well understood in the art, and the graded peas will be delivered at the side of the machine from the chutes 29 and 30.

It is thought that from the foregoing the construction and operation of my pea thresher and separator will be clearly comprehended; but while the present embodiment of the invention is believed at this time to be preferable I do not wish to limit myself to the structural details defined, but reserve the right to effect such changes, modifications, and variations thereof as may be properly comprehended within the scope of the protection prayed.

What I claim is—

1. In a threshing-machine of the character described, the combination with a pair of intermeshing threshing-cylinders located in substantially the same horizontal plane, of means for rotating said cylinders in opposite directions and at different speeds, means for delivering vines and the like to the upper side of one cylinder, means for conveying the vines away from the under side of the other cylinder, and a bodily-yielding feed-roller disposed above and in coöperative relation with the first cylinder.

2. In a threshing-machine of the character described, the combination with a casing having a vertically-movable cover, of threshing mechanism including a threshing-cylinder located in the casing, and a feed-roller mounted in the cover above the cylinder and movable toward and from said cylinder with the cover.

3. In a threshing-machine of the character described, the combination with a casing having a vertically-movable cover, of a pair of intermeshing threshing-cylinders mounted in the casing and disposed in substantially the same horizontal plane, means for rotating said cylinders in opposite directions and at different speeds, and means carried by and movable with the cover for pressing the vines fed to the machine against the first cylinder.

4. In a threshing-machine of the character described, the combination with a casing having a vertically-movable cover, of a pair of intermeshing threshing-cylinders mounted in the casing and located in substantially the same horizontal plane, means for delivering vines and the like to the upper side of the front cylinder and for conveying said vines from the under side of the rear cylinder, after said vines have been threshed between the cylinders, and a feed-roller mounted in the cover above the front cylinder and movable toward and from said cylinder with the cover.

5. In a threshing-machine of the character described, the combination with a casing having a vertically-movable cover, of threshing mechanism including a threshing-cylinder mounted within the casing, and a swinging cutter mounted in the cover and arranged to act upon the vines passing around the cylinder.

6. In a threshing-machine of the character described, the combination with a casing having a vertically-movable cover, of a pair of intermeshing threshing-cylinders mounted in the casing and located in substantially the same horizontal plane, and a swinging cutter mounted in the cover and disposed to coöperate with the front threshing-cylinder adjacent to the point at which the cylinders intermesh.

7. In a threshing-machine of the character described, the combination with a casing having a vertically-movable cover, of a threshing-cylinder in the casing, a feed-roller mounted in the cover above the cylinder and movable toward and from the cylinder with the cover, and a swinging cutter also mounted in the cover and coöperating with the threshing-cylinder at a point beyond the feed-roller.

8. In a threshing-machine of the character described, the combination with a casing having a vertically-movable cover, of a pair of intermeshing threshing-cylinders mounted in the casing and located in substantially the same horizontal plane, means for rotating the cylinders in opposite directions and at different speeds, a feed-roller mounted in the cover above the front cylinder and movable toward and from the cylinder with the cover, and a swinging cutter mounted in the cover beyond the feed-roller and coöperating with the front cylinder adjacent to the point at which the cylinders intermesh.

9. In a threshing-machine of the character described, the combination with a casing having a vertically-movable cover, of a pair of intermeshing threshing-cylinders mounted in the casing and located in substantially the same horizontal plane, means for rotating said cylinders in opposite directions and at different speeds, a feed-board for delivering vines or the like to the upper side of the front cylinder, means for conveying the vines away from the under side of the rear cylinder after said vines have been threshed between the cylinders, a feed-roller mounted in the cover above the front cylinder and movable toward and from the cylinder with the cover, and a swinging plate mounted in the cover and extending transversely across the same, said swinging plate being coöperatively related to the front cylinder adjacent to the point at which the cylinders intermesh.

10. In a threshing-machine of the character described, the combination with upper and lower threshing-cylinders rotating at the same speed and in the same direction, of a third cylinder rotating at a higher speed and in an opposite direction and meshing with the teeth of the first-named cylinders, whereby all of the teeth engaging the mass will move in the direction of movement thereof, the relative arrangement of the cylinders serving to break the mass in different directions to assist in opening it up for treatment, and the relatively higher rate of speed of the third cylinder serving to thresh the vines and thereby liberate the peas or the like.

11. In a threshing-machine of the character described, the combination with a double concave having its concavities located in different horizontal planes, of upper and lower threshing-cylinders located in said concavities and having radial teeth located out of mesh, means for rotating the upper and lower cylinders in the same direction and at the same speed, a third threshing-cylinder disposed in rear of the upper cylinder and above the lower cylinder and having its teeth meshing with the teeth of both of said cylinders, means for rotating the third cylinder at a higher speed than the other cylinders and in an opposite direction, a screen disposed to receive the vines from the cylinders, and a conveyer for moving the vines over the screen.

12. In a threshing-machine of the character described, the combination with a double concave having its concavities located in different horizontal planes, upper and lower threshing-cylinders located in the concavities of the double concave and rotating at the same speed and in the same direction but out of mesh, a third threshing-cylinder located in rear of the upper cylinder and above the lower cylinder and meshing with both of said cylinders, means for rotating the third cylinder at a higher speed than the other cylinders and in an opposite direction, and means for crushing the vines into close contact with the upper cylinder.

13. In a threshing-machine of the character described, the combination with a casing having a vertically-movable cover, of an upper threshing-cylinder, a lower threshing-cylinder located below the same and out of mesh therewith, a third threshing-cylinder located above the lower cylinder and in rear of the upper cylinder and meshing with both of said cylinders, means for rotating said cylinders to feed the vines over the upper cylinder and to impart a compound break to the mass of vines as it passes between the several cylinders, and means for pressing the vines into contact with the first cylinder, said means being mounted in the cover and movable therewith toward and from the cylinder.

14. In a threshing-machine of the character described, the combination with a casing having a vertically-movable cover, of upper and lower threshing-cylinders rotating at the same speed and in the same direction, a third cylinder rotating at a higher speed and in an opposite direction and meshing with the teeth of the first-named cylinders, whereby all of the teeth engaging the mass will move in the direction of movement thereof, the relative movement of the cylinders serving to break the mass in different directions to assist in opening it up for treatment, and the relatively higher rate of speed of the third cylinder serving to thresh the vines and thereby liberate the peas or the like, and a swinging plate mounted in the cover and acting on the vines to compel the latter to pass down between the upper and third cylinders.

15. In a threshing-machine of the character described, the combination with a casing having a movable cover, of upper and lower threshing-cylinders rotating at the same speed and in the same direction, a third cylinder rotating at a higher speed and in an opposite direction and meshing with the teeth of the first-named cylinders, whereby all of the teeth engaging the mass will move in the dirction of movement thereof, the relative arrangement of the cylinders serving to break the mass in different directions to assist in opening it up for treatment, and the relatively higher rate of speed of the third cylinder serving to thresh the vines and liberate the peas or the like, a feed-roller mounted in the cover above the first-named cylinder and movable toward and away from the same with the cover, and a swinging plate mounted in the cover beyond the feed-roller and coöperating with the first-named cylinder adjacent to the point at which the first and third cylinders intermesh.

16. In a threshing-machine, the combination with a concave, and a toothed threshing-cylinder therein, of a swinging vine-cutter disposed opposite said cylinder to cut the vines engaged thereby, said vine-cutter having projecting portions disposed opposite the spaces between the teeth of the cylinder.

17. In a threshing-machine, the combination with a concave, and a toothed threshing-cylinder therein, of a vine-cutter extending along said cylinder and comprising a strip of crimped metal.

18. In a threshing-machine, the combination with a concave, and a toothed threshing-cylinder therein, of a vine-cutter disposed opposite said cylinder and comprising a crimped strip of metal swung from its upper edge.

19. In a threshing-machine, the combination with a pair of coöperating threshing-cylinders arranged one in advance of the other, of an adjustable feed-roller arranged above the first cylinder, and a vine-cutter located beyond the feed-roller and coöperating with the first cylinder adjacent to the point at which the two cylinders intermesh.

20. In a threshing-machine, the combination with a concave, and a toothed threshing-cylinder therein, of a vertically-adjustable feed-roller located above the cylinder to regulate the feed of the vines and to press the same into engagement with the teeth of the cylinder, a vine-cutter located beyond said feed-roller, and a vertically-adjustable horizontal guard-plate disposed between the feed-roller and vine-cutter to prevent the vines from passing upwardly between said elements.

21. In a threshing-machine of the character described, the combination with a frame, of a foraminous concave, a fixed screen extending rearwardly from the edge of the concave to the rear end of the frame, threshing mechanism within the concave, a conveyer movable over the fixed screen, an incline located directly below the fixed screen to receive the peas falling therefrom, a shaking-screen disposed under the concave and out of the range of the peas falling from the fixed screen, said shaking-screen discharging at its rear end upon the front end of the incline, and a rearwardly-discharging blower having its discharge-orifice located between the adjacent ends of the incline and shaking-screen, whereby said blower projects a blast through the peas falling from the shaking-screen and also through the peas dropping from the fixed screen to the incline.

22. In a threshing-machine of the character described, the combination with a concave, a rearwardly-extending screen, threshing mechanism within the concave, and a conveyer located above the screen, of an incline located below the screen and discharging at its front end, an inclined shaking-screen located under the foraminous concave to receive peas dropping therefrom and disposed to discharge at its rear end upon the incline, and a blower located below the shaking-screen and arranged to project a blast of air rearwardly above the incline, said shaking-screen being of such mesh as to permit dirt and small particles to drop therethrough without permitting the passage of the peas.

23. In a threshing-machine of the character described, the combination with a foraminous concave, and a fixed screen extending rearwardly therefrom, of threshing mechanism within the concave, a conveyer disposed above the fixed screen, an incline located under the fixed screen and discharging at its front end, a longitudinally-inclined vibratory grading-shoe having its upper end disposed under the discharge end of the incline, a shaking-screen supported by the grading-shoe and located under the foraminous concave, said shaking-screen being longitudinally inclined and disposed to discharge the peas upon the incline, and a blower located under the shaking-screen and disposed to project a blast of air rearwardly over the incline.

24. In a threshing-machine, the combination with a concave, and a fixed screen extending rearwardly therefrom, and upwardly inclined toward its rear end, of threshing mechanism within the concave, a conveyer located above the fixed screen, a vibratory grading-shoe downwardly inclined toward its rear end, an incline located under the fixed screen and having its lower front end disposed to discharge into the upper front end of the grading-shoe, a longitudinally-inclined shaking-screen located under the foraminous concave and having its lower end disposed to discharge upon the front end of the incline, and a blower located under the shaking-screen and disposed to project a blast of air rearwardly over the incline.

25. In a threshing-machine of the character described, the combination with a foraminous concave, and a fixed screen extending rearwardly therefrom, and upwardly inclined toward its rear end, of threshing mechanism within the concave, a conveyer disposed above the fixed screen, a vibratory grading-shoe downwardly inclined toward its rear end, an incline located under the fixed screen and having its lower front end disposed to discharge into the upper front end of the grading-shoe, a shaking-screen located under the foraminous concave, and downwardly inclined toward its rear end, to discharge upon the lower end of the incline, said shaking-screen being rigidly connected with the grading-shoe for movement therewith, and a blower located under the shaking-screen and disposed to project a blast of air rearwardly over the incline.

In testimony that I claim the foregoing as my own I have hereto affixed my signature in the presence of two witnesses.

JOHN MARION BRASINGTON.

Witnesses:
W. W. BROWN,
S. A. BROWN.